(12) United States Patent
Loginov

(10) Patent No.: US 7,059,270 B1
(45) Date of Patent: Jun. 13, 2006

(54) IN-TANK FEEDER FISH DISPENSER

(76) Inventor: Evan D. Loginov, 45 Tokanel Dr., Londonderry, NH (US) 03053

( * ) Notice: Subject to any disclaimer, the term of this patent is extended or adjusted under 35 U.S.C. 154(b) by 0 days.

(21) Appl. No.: 10/978,254

(22) Filed: Oct. 29, 2004

(51) Int. Cl.
*A01K 61/02* (2006.01)
(52) U.S. Cl. .................................................. 119/51.04
(58) Field of Classification Search ............ 119/51.01, 119/51.02, 51.04, 51.11, 51.13, 51.14, 51.15, 119/57.92, 215, 251, 252, 219, 224, 230, 119/218; 43/44.99, 55, 56
See application file for complete search history.

(56) References Cited

U.S. PATENT DOCUMENTS

| | | | | |
|---|---|---|---|---|
| 2,001,468 | A * | 5/1935 | Moutoux ........................ | 43/55 |
| 2,594,172 | A * | 4/1952 | Huffman et al. ............... | 43/56 |
| 2,790,266 | A * | 4/1957 | Williamson .................... | 43/55 |
| 2,968,280 | A * | 1/1961 | Gutstein ................... | 119/51.04 |
| 3,304,645 | A * | 2/1967 | Hardesty et al. ............... | 43/55 |
| 3,308,570 | A * | 3/1967 | Horton .......................... | 43/55 |
| 4,002,146 | A * | 1/1977 | Neff ........................ | 119/51.04 |
| 4,019,459 | A * | 4/1977 | Neff ............................ | 119/223 |
| 4,188,909 | A * | 2/1980 | Spivak ........................ | 119/251 |

6,314,910 B1 * 11/2001 Tracy ...................... 119/51.04

* cited by examiner

*Primary Examiner*—T. Nguyen
(74) *Attorney, Agent, or Firm*—Cesari and McKenna, LLP

(57) ABSTRACT

This invention provides an in-tank dispenser for feeder fish and other aquatic live food that provides a separate enclosure residing within the larger main tank in a manner that allows the main tank's conditioned and heated water to flow through the enclosure. Feeder fish reside within the enclosure, allowing them the benefit of the main tank's filtered and conditioned water while separating them from the larger fish of the main tank until feeding time. At feeding time, a manually or automatically operated door is opened, allowing the feeder fish to access a funnel shaped outlet that is large enough for the feeder fish to pass therethrough, but small enough to restrict return of the feeder fish once they exit or to allow larger fish to enter the enclosure. The door can be perforated, and can be flapped opened and closed to help urge feeder fish into the area of the funnel. The enclosure can, likewise, be perforated to allow passage of water therethrough. In one embodiment, the door is actuated by a pivoting lever arm that extends upwardly above the rim of the main tank. The lever arm can include a holding or locking mechanism that retains the door in an opened or closed position as needed. Alternatively, the door can be actuated by a motorized actuator that is connected to a power source and a switch and/or timer.

14 Claims, 4 Drawing Sheets

IN-TANK FEEDER FISH DISPENSER

BACKGROUND OF THE INVENTION

1. Field of the Invention

This invention relates to home aquariums and more particularly to systems for storing and dispensing live fish food.

2. Background Information

Home aquariums are extremely popular and found in many homes throughout the country and world. Typically, a home aquarium consists of a glass or plastic tank having a capacity of between several gallons and several hundred gallons. Fresh or salt water is provided and is cleaned regularly by a filtration system. A water heater, artificial or natural plants and a gravel or sand substrate may also be provided. Within the tank, fish of various sizes may be kept, depending, in part, upon the size and volume of the tank. Small fish are usually fed small-sized granules of dried food or small frozen or live animals, such as blood worms or brine shrimp. However, larger fish (a few inches or more is in length) often thrive on larger-scale food, such as small goldfish, guppies or tuffies. To satisfy a large fish's desire for live "feeder fish," the aquarium owner is generally faced with two alternatives. He or she can either maintain a separate fish tank (often having its own heat, filtration substrate, etc.) in which a large stock of feeder fish are kept, or can make frequent trips to the store to purchase feeder fish as needed. In the former case, a great deal of additional space, energy and time is consumed in maintaining a feeder fish tank, simply to support the main tank. In the latter case, time and resources are spent to repetitively fetch a small supply of feeder fish.

While it is possible to purchase more feeder fish than will be used in a single feeding, they must be maintained in a relatively clean environment until needed, otherwise the feeder stock will likely die before the next feeding. Hence, a separate tank with adequate filtration is unavoidable unless the numbers of feeder fish retained for future use is quite low and the period of storage is quite short. Hence, a way to maintain a larger supply of feeder fish for a reasonable length of time without the need of a separate tank is highly desirable. A way to deliver the proper number of feeder fish to the tank is also desirable.

SUMMARY OF THE INVENTION

This invention overcomes the disadvantages of the prior art by providing an in-tank dispenser for feeder fish and other aquatic live food that provides a separate enclosure residing within the larger main tank in a manner that allows the main tank's conditioned and heated water to flow through the enclosure. Feeder fish reside within the enclosure, allowing them the benefit of the main tank's filtered and conditioned water while separating them from the larger fish of the main tank until feeding time. At feeding time, a manually or automatically operated door is opened, allowing the feeder fish to access a funnel shaped outlet that is large enough for the feeder fish to pass therethrough, but small enough to restrict return of the feeder fish once they exit and to also prevent larger fish from entering the enclosure.

In one embodiment, the door can be perforated, and can be flapped opened and closed to help urge feeder fish into the area of the funnel. The enclosure can, likewise, be perforated to allow passage of water therethrough. The bottom can be adapted to allow a gravel or similar substrate if desired to catch wastes and weigh-down the enclosure. An integrally molded or applied hook is attached along one side of the enclosure to allow it to depend from a top rim of the main tank. When so mounted, the upper rim of the enclosure is above the waterline so that fish cannot enter into or escape from the enclosure through the top. The top can be open or can be covered as appropriate.

In one embodiment, the door is actuated by a pivoting lever arm that extends upwardly above the rim of the main tank. The dispenser can include a door holding or locking mechanism that retains the door in a closed or opened position as needed. The locking mechanism can consist of magnets on the door and surrounding structures or door handle detents or bends that selectively lock the door. In an alternate embodiment, the door can be actuated by a motorized actuator that is connected to a power source and a switch and/or timer. A controller is provided to respond to commands of the switch or timer so as to open or close the door based upon either a user's command or automatically at a preset time using a timer-based signal. A sensor can be provided at the funnel to determine if and when a feeder fish passes out of the enclosure and into the tank. The number of feeder fish can be counted based upon the sensor and the door can be directed by the controller to close after a programmed number of feeder fish have passed into the main tank.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
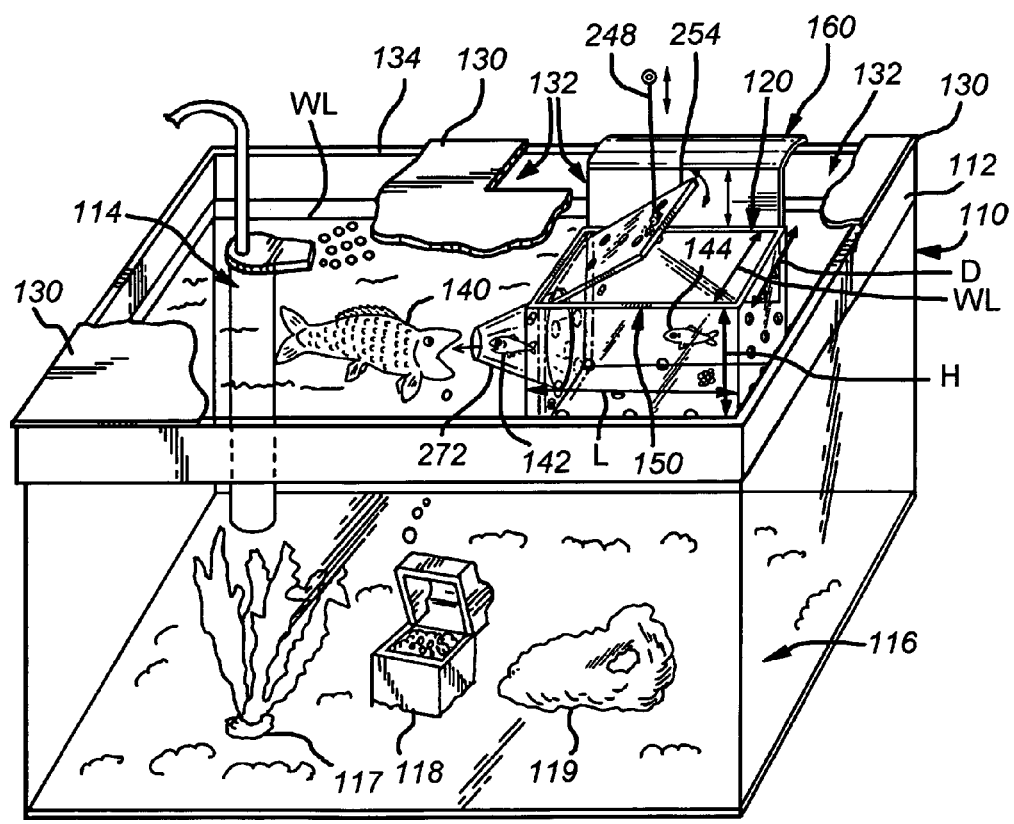
FIG. 1 is a perspective view of a typical home aquarium including a main tank and a manually operated in-tank feeder fish dispenser according to an embodiment of this invention.

FIG. 1 details an exemplary main fish tank 110 having installed therein an in tank-feeder fish dispenser 120 according to an embodiment of this invention. The exemplary main tank is substantially larger than the dispenser 120 so that the dispenser occupies a relatively small area of the overall main tank perimeter as defined by the rim 112. The relative sizes and volumes of the main tank 110 and dispenser 120 are each highly variable, so long as the dispenser is small enough in height and perimeter shape to fit within the main tank. In one example, the main tank can be a standard, commercially available 20–30 gallon tank and the dispenser can have a height H of approximately 4–7 inches, a depth D of approximately 4–6 inches and a length L of approximately 7–12 inches.

The main tank is constructed from a suitable, typically transparent, material such as glass or a durable synthetic such as Lexan®. The exemplary main tank includes a filtration and aeration system 114, a gravel substrate 116 and appropriate plants (natural or artificial) 117, decorations 118 and other objects (rocks, etc.) 119. Other water conditioning and monitoring devices, such as heaters, thermometers and chemical treatment units (not shown) can also be provided. In addition, it is contemplated that the main tank 110 may be covered by a hood 130, which is shown in partial view. Such hoods are commercially available and may include a number of features including a front hinged hatch, lighting unit and rear cutouts 132 for allowing various wires, tubes and accessories to depend from the rear rim 134.

In this example, the main tank 110 houses large fish 140. These large fish 140 desire to eat smaller feeder fish 142 and 144 housed within the dispenser 120. To prevent the large fish 140 from simply eating the smaller fish 142 and 144 outright, the dispenser is sealed along its sides and bottom and its open top rim 150 is located above the level of the water line WL of the main tank. In this manner the smaller fish 142 and 144 are maintained securely within the confines of the dispenser 120. Note that the dispenser rim 150, while above the waterline WL is located below the top of the main tank rim 112 in this embodiment. As such, the hood 130 can rest over the rim 150 without interference therebetween. In this configuration, the hood, itself acts as a loose cover for the dispenser as well as the main tank. Alternatively, a removable cover (not shown) can be applied to the dispenser's open top.

Figure 2:
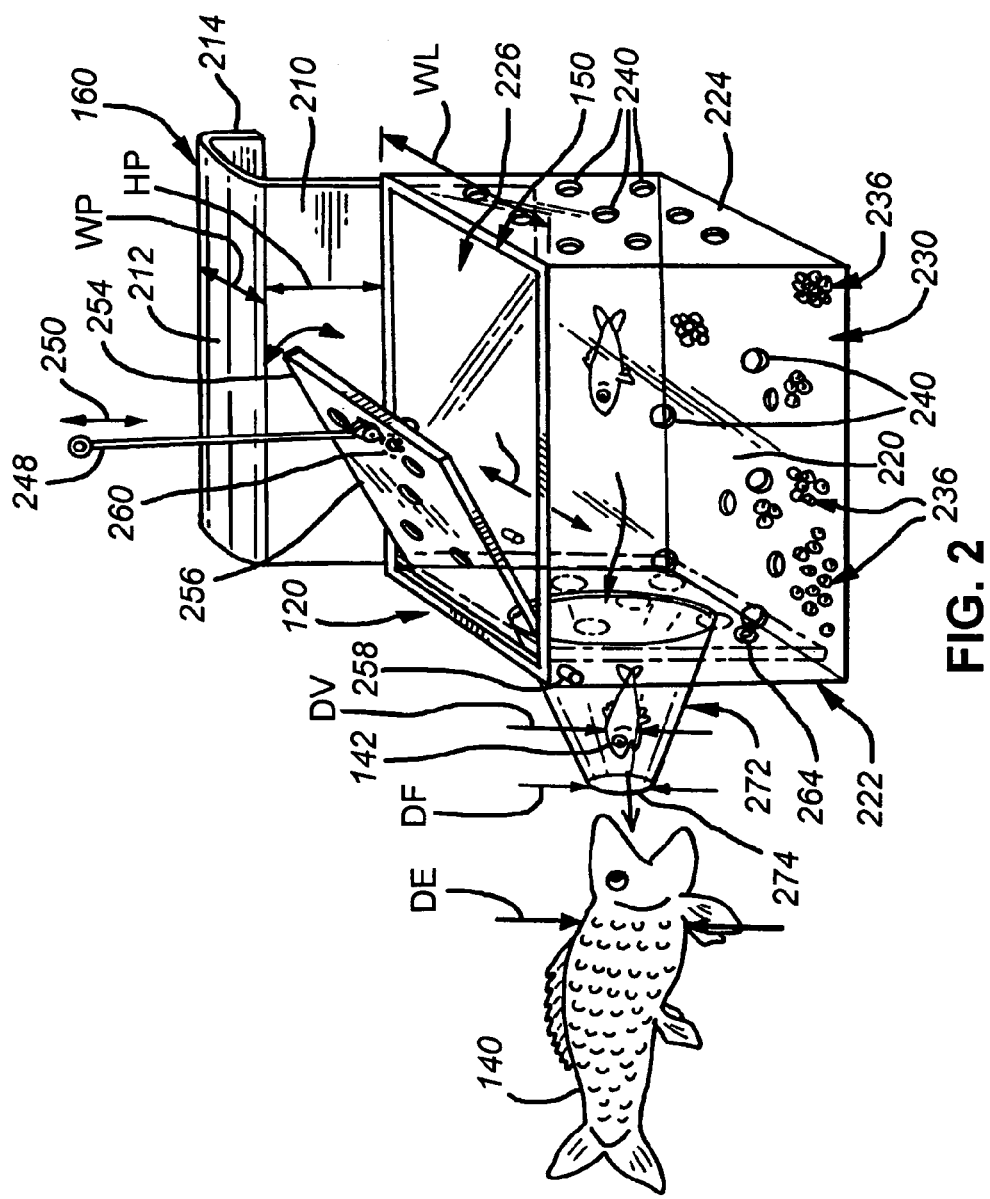
FIG. 2 is a more-detailed perspective view of the in-tank feeder fish dispenser of FIG. 1.

The dispenser, in this embodiment, is retained within the main tank at a desired elevation with respect to the rim 112 by a rear "hook" assembly 160 that engages the rim. This hook 160 is typically located relative to one of the cutout areas (132 in FIG. 1) in the rear of the cover hood 130 so that it does not interfere with the hood. With further reference to FIG. 2, the hook assembly 160 of the dispenser 120 is formed with a forward plate 210 that extends downwardly from a rim-top-engaging top plate 212. The width WP of the top plate 212 is chosen to be at least as large as the widest rim top expected to be encountered. In one embodiment WP is approximately 1 inch. The front plate has a height HP that is chosen to locate the dispenser rim 150 at least slightly below the level of the main tank rim (112 in FIG. 1). In one embodiment, HP is between approximately ¼ inch and 1½ inch. This dimension is highly variable, however, an in an alternate embodiment, the height can be made adjustable by bendable units, set screws and other multi-position structures (not shown). The rear of the hook 160 can include a short flange plate 214 that restricts movement of the hook onto and off of the main tank rim. Note that the hook 160 in this embodiment is a unitary or integral structure that is typically molded with the dispenser. Alternatively, the hook can be an attached or applied structure in one or more parts (e.g. spaced-apart separate hook sections) formed of metal, plastic or other suitable materials (or combinations of materials).

The dispenser 120 in this embodiment is molded as a unitary member with sides 220, 222, 224 and 226 and a bottom 230. The dispenser 120 can be constructed from a variety of materials, but is most typically constructed from transparent plastic, such as polystyrene. At least some of the sides 220, 222, 224 and 226 (and optionally the bottom 230) are perforated with small perforations 240 that allow relatively free flow of main tank water into and out of the dispenser enclosure. The size and number of perforations is highly variable. In general, the perforations are small enough to prevent the smallest feeder fish to be stored therein from escaping through the perforations. In one embodiment, perforated sides can be implemented using a regular mesh or gridwork for maximum flow. As shown, the bottom 230 of the dispenser can be provided with a substrate, such as gravel 236 to help weight the dispenser down within the main tank water and to catch droppings from the feeder fish. Alternatively, the bottom 230 can be free of substrate, and may or may not be perforated. Where clear, the bottom will tend to disappear to a viewer looking upward, making for an interesting overall view contrasting between large fish and small fish.

By allowing relatively free flow and exchange of water between the main tank and the filter, the dispenser of this invention allows the feeder fish to be maintained in the same tank as the larger predatory fish and offers the feeder fish the same highly treated water as the predatory fish, thereby enabling such feeder fish to be maintained in the tank for long periods until they are needed and without requiring a separate tank specifically for feeder fish to be maintained.

As shown in FIG. 2, when a feeder fish is needed, the user moves a pivoting handle 248 upwardly (see arrow 250) to pivot upwardly (see curved arrow 252) a door 254 located adjacent to the side 222 from a fully closed position (shown in phantom) to a fully opened position. The door is perforated (perforations 256) for reduced resistance in this embodiment. A pivot hinge 258 is provided with respect to the sides 220 and 226 to facilitate pivoting of the door 254. A variety of hinge arrangements can be employed. The handle 248 can be located to project through the cutout area (232 in FIG. 1) of the hood so that the hood need not be removed during operation. The handle 248 and/or door 254 can include various locking or securing mechanisms to allow it to be maintained in an opened state or secured in a closed state. In this example, the door includes a magnet 262 that acts as both a weight and a securing mechanism. In one embodiment, in the opened position, the magnet 262 engages a small magnet 260 (shown in phantom) that can be adhered to the hood top or one of either the dispenser or tank rims (150 or 112). Likewise another magnet 264 can be provided near the bottom of the dispenser side 222 to removable secure the door 254 when in a closed position. Pulling on the handle 248 overcomes the attraction between the magnets in both the fully closed and fully opened states.

As shown, when the door is opened, it allows a feeder fish to venture into the opening 270 in the side 222. The opening leads to a tapering frustoconical "funnel" exit section 272. The opening 270 can have a relatively large diameter (1–3 inches, for example), while the outer end 274 has a diameter DF that is sized smaller that the general diameter or girth DE of the predatory fish 140 and is larger that the general diameter or girth DV of the feeder fish 142. In one example the diameter DF is approximately ½–¾ inch, but this dimension is highly variable and can be altered by the user in a commercial embodiment altering the length of the funnel 272 using a saw, file or the separation of breakable end segments.

In operation, once one or more feeder fish stray into the funnel 272, the user can close the door 254 behind them, and they will eventually stray out into the main tank to be eaten by the waiting predatory fish. Alternatively, where feeder fish are reluctant to enter the funnel 272, the door can be used as a fan by repeatedly flapping it to force feeder fish into and through the funnel 272. In general, the tapering of the funnel makes it more difficult for feeder fish to return to the dispenser 120 once they exit the end opening 274. By carefully controlling the movement of fish into the funnel an exact, or reasonably exact, number of feeder fish can be dispensed from the dispenser 120 when needed, while any remaining fish are maintained in the dispenser in good health and out of the mouth(s) of the main tank's predatory residents.

Note that the door 254 in this embodiment is only slightly smaller than the inside edges of the side 222. This aids in urging feeder fish into the funnel 272 during a flapping operation, as they are less capable of escaping from the sides of the door. In alternate embodiments, the door can be sized more closely to the size of the opening.

Figure 3:
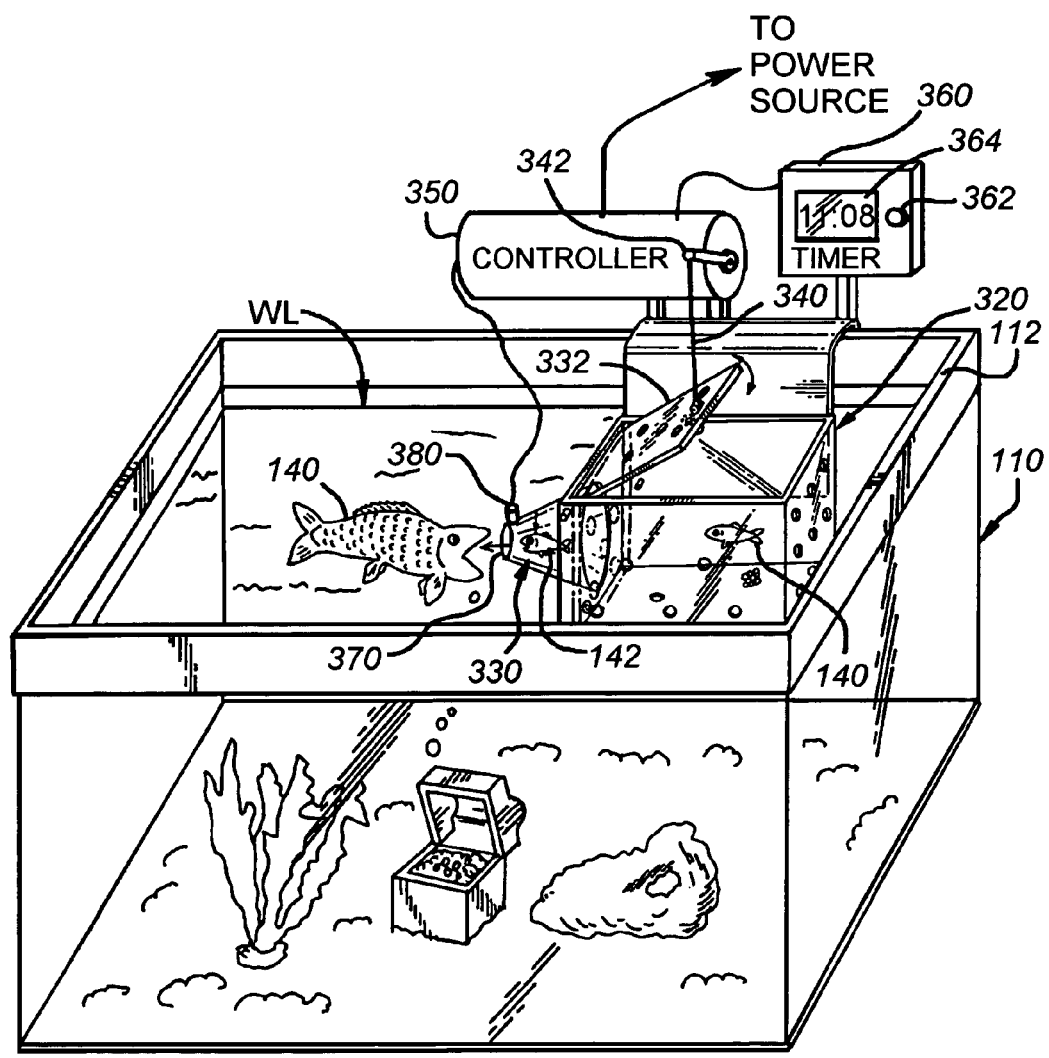
FIG. 3 is a perspective view of a typical home aquarium including a main tank and an automatically operated in-tank feeder fish dispenser according to an alternate embodiment of this invention.

FIG. 3 shows an alternate embodiment of a feeder fish dispenser 320 located within the tank 110 described above. The dispenser in this embodiment is structurally similar to the dispenser 120 described above in terms of size, shape, materials, size and shape of the exit funnel 330 and pivoting operation of the door 332. This dispenser, however, is controlled by an automated system that moves the door via a linkage 340 that is operatively connected to a moving, motorized arm 342. The motor used can vary widely. For example, a solenoid, linear motor, servo, stepper motor, pneumatic actuator or any other mechanism can be used to move the door. While not shown, the door may slide, rather than pivoting to open and close, and/or may pivot along a different axis than that shown. The motor is part of a controller 350 that receives power from a power source, such as household current. The controller may be connected to a timer and display module 360 with appropriate setting interface buttons 362 and display 364. The time can be set to automatically open and close the door at predetermined times and to maintain the door in an open position for predetermined intervals of time. An optical sensor (or light-beam sensor) 380 is provided at the end opening 370 of the funnel 330. This sensor can be adapted to sense passage of a feeder fish through the opening 370. Since the opening 370 is relatively small, typically only one fish at a time is sensed.

Figure 4:
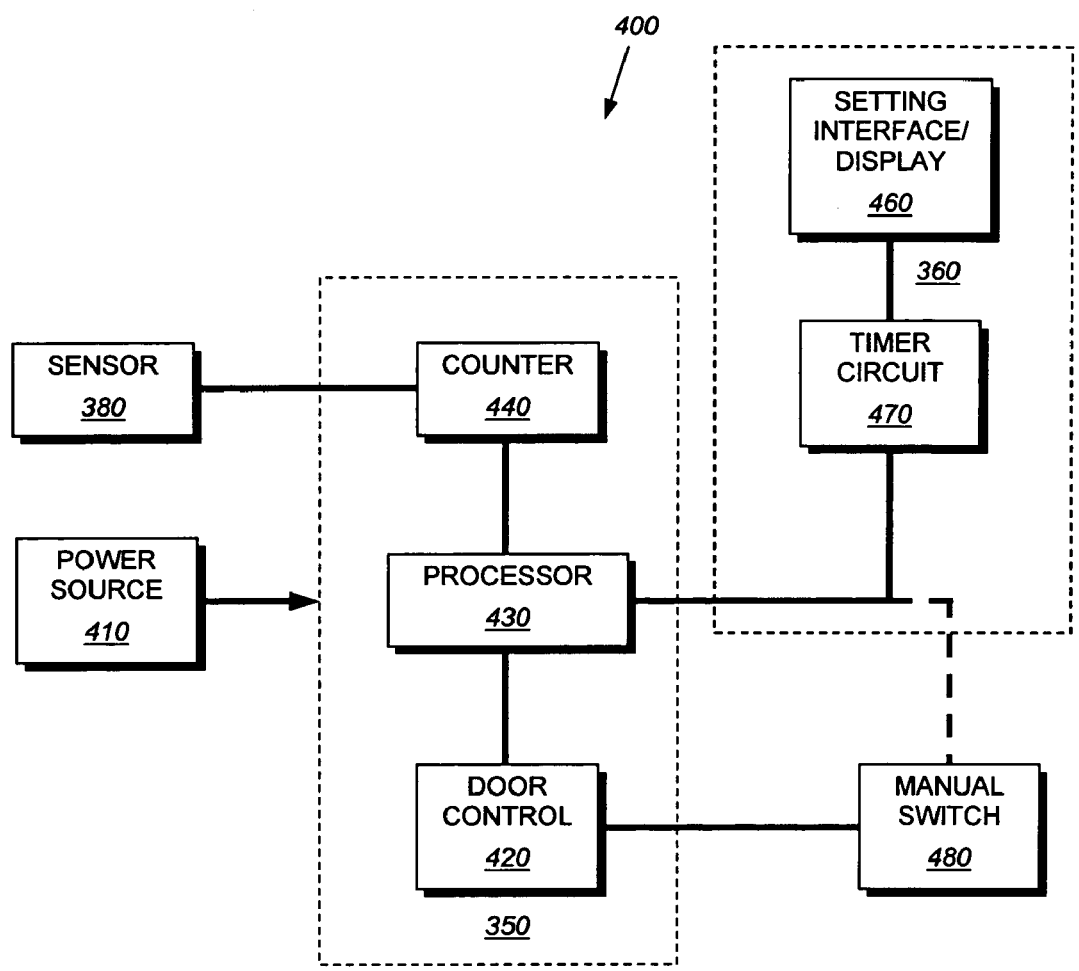
FIG. 4 is a block diagram of a door control system for the automatically operated in-tank feeder fish dispenser of FIG. 3.

With further reference to FIG. 4, an exemplary circuit 400 for controlling an automated dispenser 320 is shown. A power source 410, typically converting battery or household power to a level and type acceptable for operating a circuit is shown. The power source interconnects with the circuit 350 that defines the controller. This includes a door control 420 having a motor and mechanism for recognizing movement commands and limits of operation. The door control 420 is connected to a main processor 430 that can be a state machine or any acceptable microcontroller/processor. This unit interprets commands and state information from various elements of the circuit 400 and instructs movement of the door to each of the opened and closed positions based upon such commands. One or more of the circuit components herein may contain memory to store program commands and operational functions. Alternatively a separate memory can be provided.

In this embodiment of the circuit 400, a counter 440 is interconnected to the processor 430. This counter receives pulses from the sensor 380 at the end of the funnel 330 (FIG. 3) and determines therefrom how many fish have passed through the funnel. The processor 430 can be programmed by the user through the interface 460, which is show as part of the timer 360, to close the door after a preprogrammed number of feeder fish have passed therethrough. Note that some fish may remain uncounted in the funnel after the door closes, the limitations of the funnel's size means that the number of leftover feeder fish (if any) in the funnel will be minimal.

The time circuit can be programmed for actual time and door operation time via the interface 460 and timing is kept by the timer circuit 470 of the overall time 370 as shown. Time signals are sent to the processor to be acted upon. In an exemplary operational scenario, the user enters a daily time at which feeder fish are to be dispensed. He or she then enters the number to be dispensed each time. When the time comes, the door is opened. The sensor keeps of count of passages through the funnel. A number of factors can go into counting a given passage. For example, it may be required that a fish be sensed for a given time interval to ensure it has placed its entire body through the opening and not simply poked its head through. When a preprogrammed number of fish have been sensed, the door again closes. A further option is that the door may close after a predetermined time, even if the desired number of fish have not been sensed. This prevents over feeding through failure to accurately sense the fish (and thereby allowing too may to escape). Likewise, the door may be programmed to flap open and closed under certain conditions to help urge fish toward the funnel. The interface can include an audible or visual notification of a fault or failure to feed the desired number of fish.

The system can also include a manual switch 480 located (for example) on the interface panel of the timer 360. The manual switch 480 allows a user to directly operate the door control 420 to dispense fish when desired outside of a timed program. In one embodiment, the processor can be adapted to poll the sensor (based upon an appropriate interface command) to automatically close the manually opened door when a predetermined number of fish have been counted or a maximum open time has been reached.

This allows the user to "press-and-walk-away" when desired. The form factor of the controller 350 and timer 360 is highly variable. A variety of implementations and shapes can be employed that afford the user a pleasing appearance and good functionality. In an alternate embodiment, for example, the timer and interface can be integrally mounted on the main controller housing. In other embodiment, remote controls can be employed, and/or home-controller and PC interfaces can be employed to allow the feeder fish dispenser to be part of a larger home automation system.

The foregoing has been a detailed description of illustrative embodiments of the invention. Various modifications and additions can be made without departing from the spirit and scope thereof. For example, the location of the funnel and door can be with respect to any side of the dispenser or with respect to multiple sides or the bottom. The shape of the dispenser is highly variable. In alternate embodiments the shape can be cylindrical or spherical. Also, while the dispenser is shown as transparent, it is contemplated that one or more sides can be opaque. In addition, while a particular arrangement of circuit components is shown and described, it is expressly contemplated that the functions described herein (and others) can be implemented with a variety of circuit arrangements including a single customized or commercially available microchip or programmable processor that performs all functions described. Further, the mechanism for actuating a motorized door is highly variable. In an alternate embodiment, the door can be operated by magnetic drives and/or can include spring-loaded components. Accordingly, this description is meant to be taken only by way of example and not to otherwise limit the scope of the invention.

What is claimed is:

1. An in-tank dispenser for live food comprising:
 a dispenser enclosure having a hook that secures the enclosure to a rim of a main tank having water therein, the enclosure having perforations along at least some portions thereof so as to allow the water from the main tank to pass through the enclosure, the perforations being sized so as to prevent the live food in the enclosure from escaping therethrough;
 an exit structure that narrows from an opening first size at the enclosure to an exit opening smaller second size at a point more remote from the enclosure, the second size being sufficient to allow the live food to pass therethrough and insufficient to allow a resident of the main tank that eats the live food to pass therethrough; and a movable door that movably covers the opening to selectively allow the live food to pass through the exit opening, wherein the door is adapted to pivot between an open position and a closed position within the dispenser enclosure and the closed position being in contact with the exit structure and including a handle operatively connected to the door.

2. The in-tank dispenser as set forth in claim 1 wherein the handle extends through a cutout area in a hood of the main tank.

3. The in-tank dispenser as set forth in claim 2 wherein the door includes perforations.

4. The in-tank dispenser as set forth in claim 2 wherein the door includes a locking structure that engages a corresponding locking structure constructed and arranged to maintain the door in at least one of the open position and the closed position.

5. The in-tank dispenser as set forth in claim 4 wherein the locking structure and corresponding locking structure each comprise a magnet.

6. The in-tank dispenser as set forth in claim 1 wherein the door is interconnected to a motorized door control that receives at least one of timed opening commands and user-switched opening commands.

7. An in-tank dispenser for live food comprising:

a dispenser enclosure having a hook that secures the enclosure to a rim of a main tank having water therein, the enclosure having perforations along at least some portions thereof so as to allow the water from the main tank to pass through the enclosure, the perforations being sized so as to prevent the live food in the enclosure from escaping therethrough;

an exit structure that narrows from an opening first size at the enclosure to an exit opening smaller second size at a point more remote from the enclosure, the second size being sufficient to allow the live food to pass therethrough and insufficient to allow a resident of the main tank that eats the live food to pass therethrough;

a movable door that movably covers the opening to selectively allow the live food to pass through the exit opening;

a motorized door control, interconnected to the movable door, that receives at least one of timed opening commands and user-switched opening commands; and a processor operatively connected to a sensor that senses a number of individual live food exiting the enclosure and that directs closing of the door by the door control in response to counting a predetermined number of sensed individual live food by the sensor.

8. The in-tank dispenser as set forth in claim 7 wherein the sensor is located adjacent to the exit opening.

9. The in-tank dispenser as set forth in claim 1 wherein the enclosure includes a bottom side adapted to receive a substrate thereon.

10. The in-tank dispenser as set forth in claim 1 wherein the enclosure defines a rim at a top opening and the hook is constructed and arranged to position the rim above a water line of the main tank and below a top of the rim of the main tank.

11. The in-tank dispenser as set forth in claim 10 wherein the hook comprises an integrally formed member attached to a portion of the rim of the enclosure.

12. The in-tank dispenser as set forth in claim 1 wherein at least some of the perforations are along the bottom surface of the dispenser and are arranged so as to allow droppings from the live food to fall through the perforations.

13. The in-tank dispenser as set forth in claim 1 wherein the bottom of the dispenser is provided with a substrate which weights down the dispenser and catches droppings from the live food contained in the dispenser.

14. An in-tank dispenser for live food comprising:

a dispenser enclosure having a having a hook attached to the rim of the enclosure arranged to position the rim of the enclosure above the water line of a main tank having water therein, the dispenser enclosure having perforations along at least some portions thereof so as to allow water from the main tank to pass through the enclosure, the perforations being sized so as to prevent the live food in the enclosure from escaping therethrough;

an exit structure that narrows from an opening first size at the enclosure to an exit opening smaller second size at a point more remote from the enclosure, the second size being sufficient to allow the live food to pass therethrough and insufficient to allow a resident of the main tank that eats the live food to pass therethrough; and a hinged door adapted to pivot between an open position and a closed position within the dispenser enclosure, the closed position being in contact with the exit structure, whereby the door movably covers the exit structure to selectively allow the live food to pass through the exit opening.

* * * * *